(No Model.)
W. H. CARMONT.
WHEEL TIRE.
No. 364,989. Patented June 14, 1887.
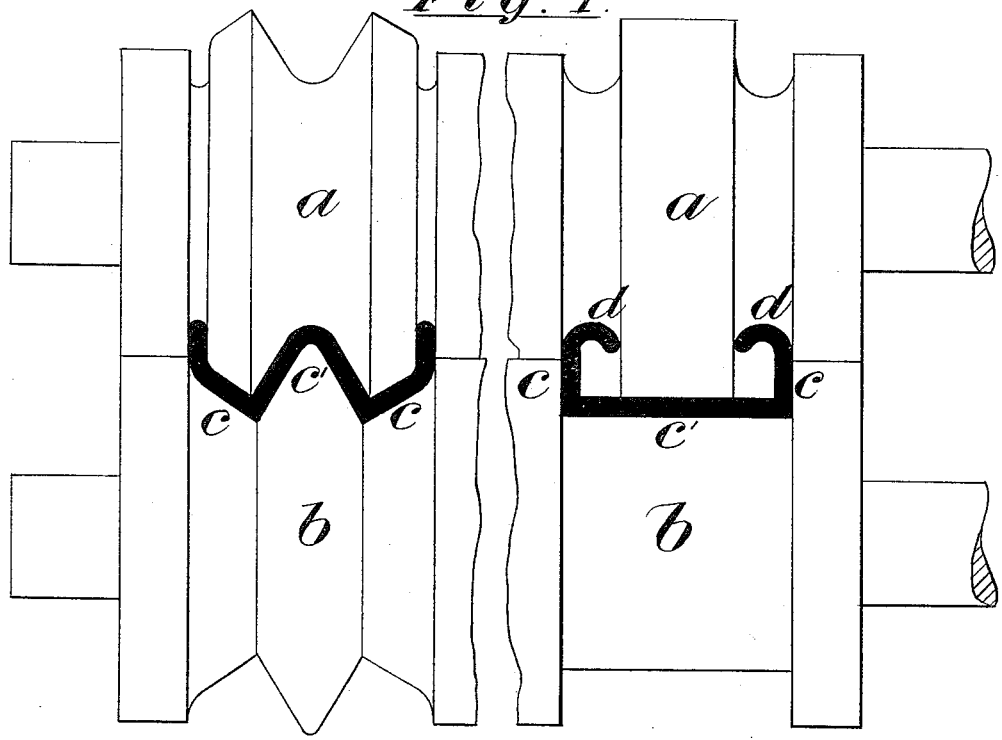
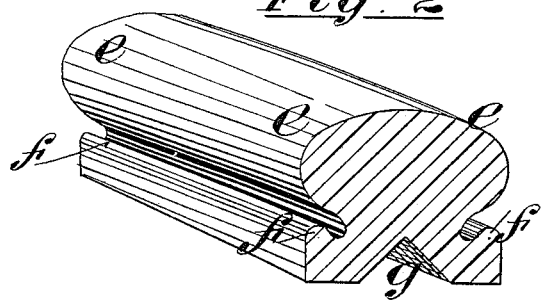
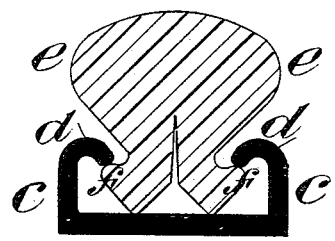
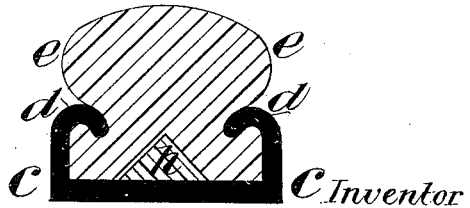
Witnesses:
William D. Conner
David L. Williams
Inventor
William H. Carmont
by his Attorneys
Howson & Sons

United States Patent Office.

WILLIAM H. CARMONT, OF MANCHESTER, COUNTY OF LANCASTER, ENGLAND.

WHEEL-TIRE.

SPECIFICATION forming part of Letters Patent No. 364,989, dated June 14, 1887.

Application filed January 15, 1887. Serial No. 224,432. (No model.)

*To all whom it may concern:*

Be it known that I, WILLIAM HASSAL-WOOD CARMONT, a subject of the Queen of Great Britain and Ireland, residing at Manchester, county of Lancaster, England, have invented certain Improvements in Metal Wheel-Tires for Use in Combination with Rubber Treads, of which the following is a specification.

My invention relates to metal wheel-tires, which are grooved or recessed or otherwise formed of such a section as will hold and retain rubber tires or treads sprung or inserted into the said wheel-tires. Previous to my invention such tires have usually been formed with dovetail grooves, into which a correspondingly-shaped tire of rubber has been sprung or forced. It has, however, been found that the rubbers inserted into tires of this form are apt to come out, and attempts have been made to retain them by providing barb shaped ribs within the flanges of the tire to take hold of the rubber; but the sharp edges of the barbs cut into the rubber treads and tend to tear them under strains.

My improved tire is formed with curved hook-shaped sides, which engage with a rubber tread of corresponding section and hold it much more securely than is the case with the dovetail section, and without danger of cutting the rubber. The rubber tread is so formed as to facilitate its insertion into the metal tire, and a key or wedge of the same material as the tread, or of a different material, is applied to lock the rubber tread in position.

Figure 1 of the annexed sheet of drawings shows a convenient method of rolling my improved section of tire. Fig. 2 is a view of the rubber tread or tire to be inserted into the metal tire. Fig. 3 shows the wedge for locking the rubber tread in the metal tire. Fig. 4 shows the rubber in process of being inserted into the tire. Fig. 5 is a complete section of the metal tire and rubber tread fixed *in situ* by the wedge.

Referring to Fig. 1, a piece of iron or steel of the required thickness and breadth is first passed between the rolls $a$ $b$, which give it the sectional form marked $c$. The bent back $c'$ of the section $c$ is then pressed or rolled flat, and the section attains the finished form by the last rolling operation, which turns over the curved hook-shaped sides, as shown at $d$, Fig. 1, and completes the tire. The rubber tread which is to occupy this improved section of tire is shown separately at Fig. 2, and marked $e$. It will be seen that its lower part corresponds in section to the interior of the metal tire, the shoulders $f$ entering beneath the curved hooked sides $d$ of the metal tire. In order to admit of the rubber tread $e$ being easily inserted into the metal tire $c$, I form a groove, $g$, in the bottom of the tread $e$, which admits of its lower part being compressed, as shown at Fig. 4, so as to introduce the shoulders $f$ beneath the hooked sides $d$.

To prevent the tread from being pulled out of the tire, I introduce a key or wedge, $h$, (shown separately at Fig. 3,) which fills up the groove $g$ and locks the tread in the tire. The key or wedge $h$, which is made of rubber or of other suitable material, may be introduced into the groove at the same time that the tread is being placed in the tire; or it may be drawn into the groove afterward. For example, while the tread is being placed in the tire, or after it has been so placed, a wire cord or other attachment might be laid in or passed through the groove $g$ and the rubber wedge $h$ extended so as to decrease its bulk. Then it could be easily pulled through the groove, and then released, when it would distend or enlarge by virtue of its elasticity, so as to completely fill the groove $g$.

Fig. 5 shows the section of the metal tire $c$ in combination with the rubber tread $e$. I might, however, make and fix the tread $e$ without any groove or wedge, and compress the solid rubber sufficiently to spring it into the metal tire.

If thought desirable, cement may be used to increase the security of the tread in the tire.

I claim as my invention—

The metal wheel-tire $c$, having overhanging hook-shaped sides $d$, in combination with the rubber tread, having shoulders $f$ and groove $g$, and a key, $h$, as and for the purpose set forth.

In testimony whereof I have signed my name to this specification in the presence of two subscribing witnesses.

W. H. CARMONT.

Witnesses:
 DAVID FULTON,
 ARTHUR LEDGER.